UNITED STATES PATENT OFFICE.

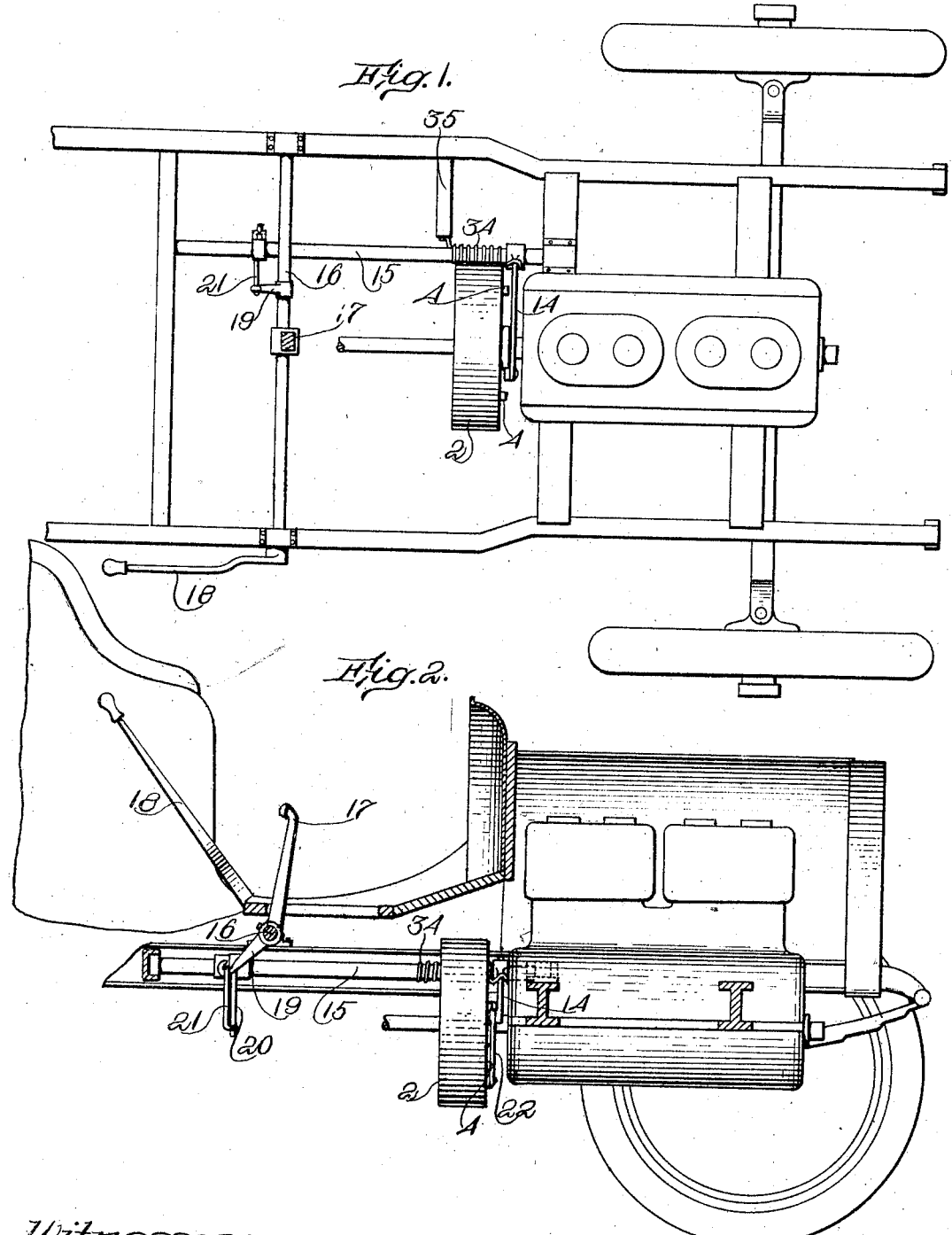

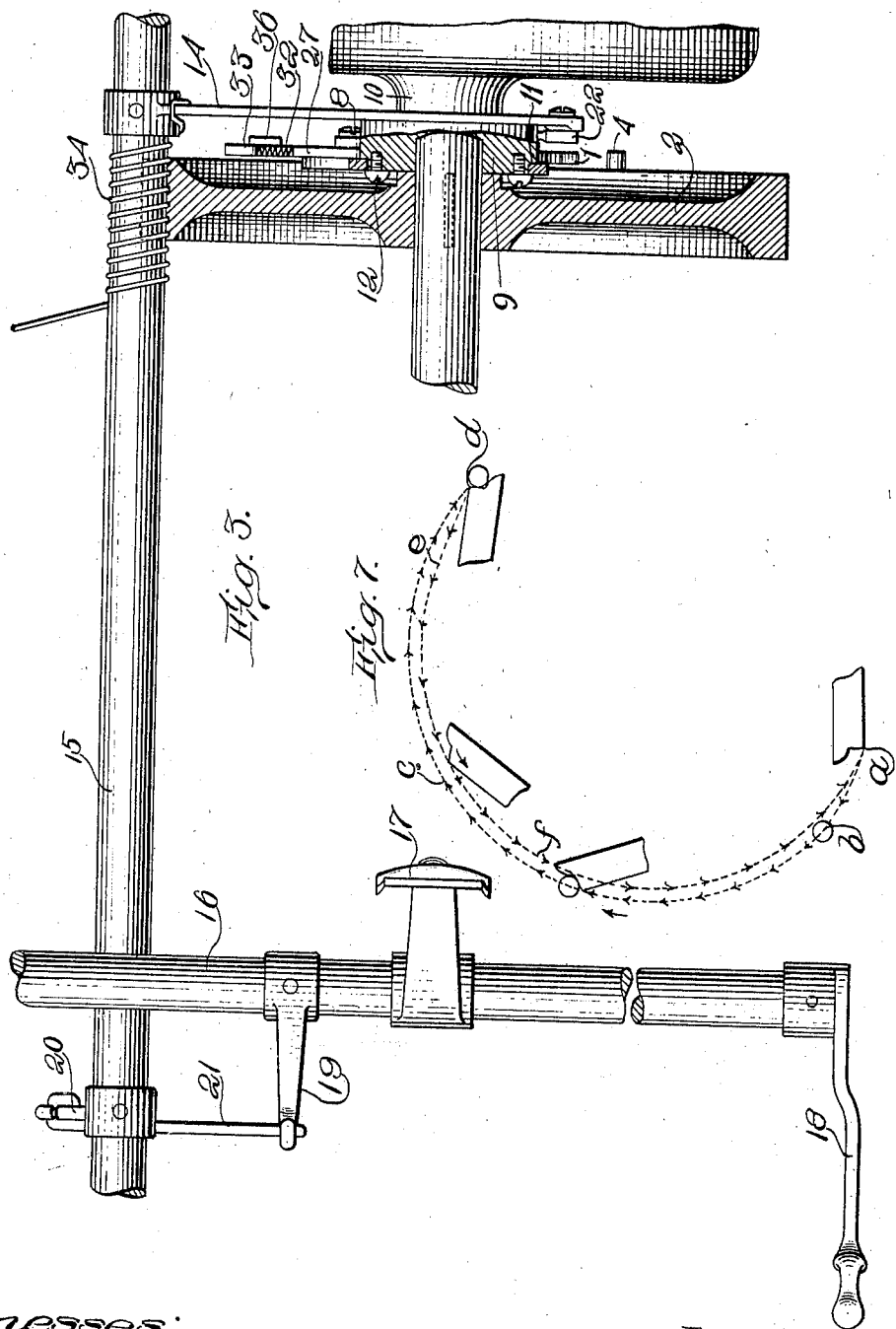

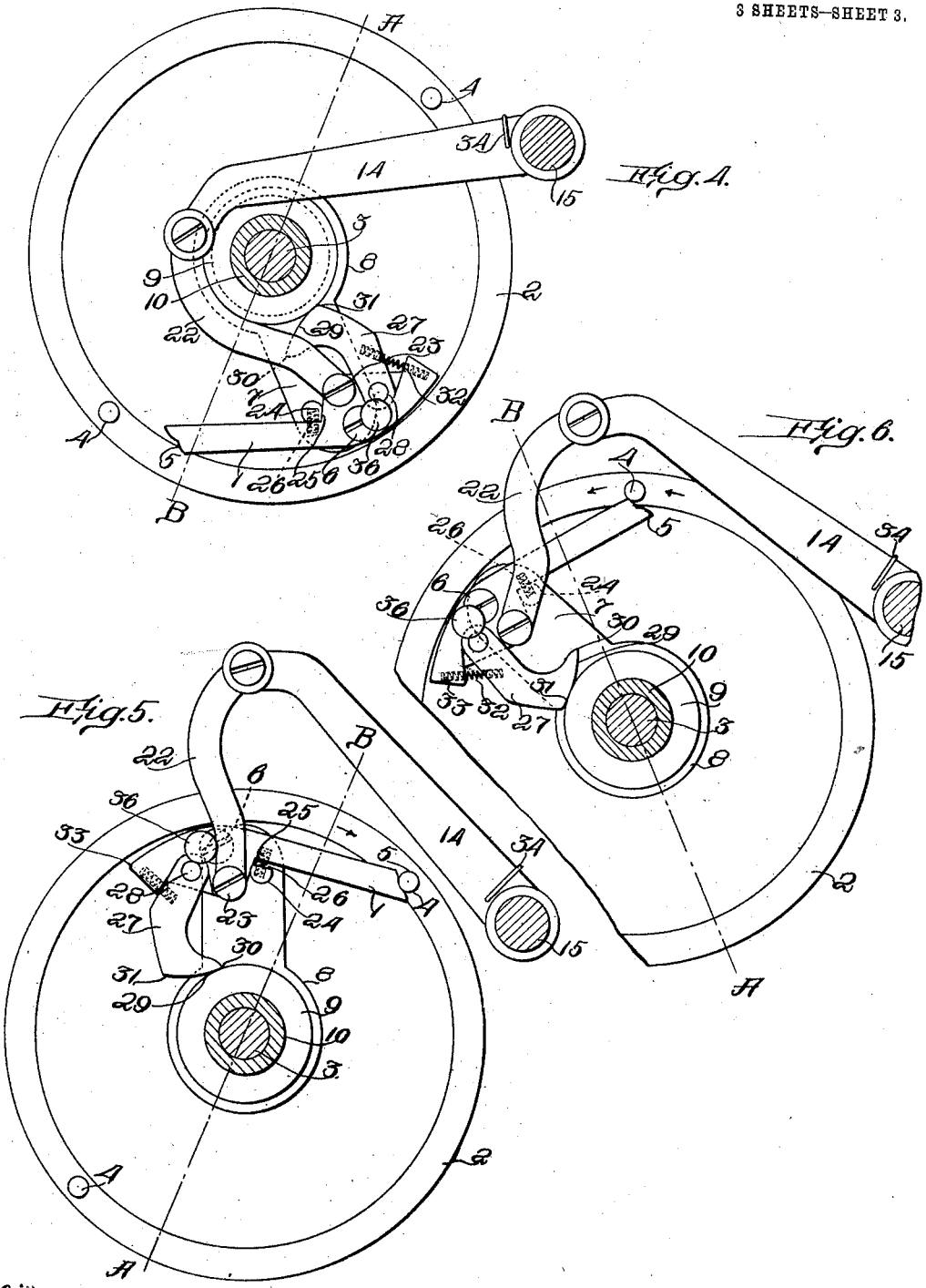

JOHN FRANKLIN WILKINSON, OF GLOUCESTER, MASSACHUSETTS.

MOTOR-STARTER.

1,002,616.   Specification of Letters Patent.   Patented Sept. 5, 1911.

Application filed January 16, 1909. Serial No. 472,672.

*To all whom it may concern:*

Be it known that I, JOHN FRANKLIN WILKINSON, of Gloucester, in the county of Essex and State of Massachusetts, have invented certain new and useful Improvements in Motor-Starters, of which the following is a specification.

This invention has reference to a mechanical appliance for starting internal combustion motors, and is particularly designed to be applied to automobile vehicles so that the motor of such a vehicle may be started by the driver while remaining in his seat.
The primary object of the invention is to provide a motor starter which is entirely mechanical and positive in its action, being thereby independent of storage reservoirs for gas under pressure, or of pumping means for producing a pressure such as have hitherto been used for similar purposes.

A secondary object is to eliminate danger of any of the parts of the mechanism being broken in consequence of a premature ignition of the charge in the motor cylinder, which would have the effect of driving the motor in the direction opposite to that intended.
Still another object is to make the construction of the mechanism such that a single impulse applied by the driver will be sufficient to carry the motor past the dead point, and thereby permit the expansion of a charge compressed in one of the motor cylinders to carry the rotating parts beyond the point at which they are left by the starting mechanism at the end of a stroke thereof.
A still further object is to construct the mechanism in such a way that the oscillating driver may be swung through more than half a revolution in order that it may be operable in one actuation to carry the motor past the firing point of one of the cylinders, where it is applied to a four-cylinder motor.

In carrying out the objects of the invention, I have provided a positive clutch consisting of two primary members, one of which is secured to the shaft of the motor, and the other of which is arranged to be oscillated by the driver or operator of the motor, and makes positive engagement with the first member of the clutch. In order to eliminate danger of breakage from back-firing of the motor, I provide a cam lever associated with the driving member of the clutch to effect disengagement thereof from the driven member.

An embodiment of the invention is illustrated in the accompanying drawings, forming a part of this specification, in which,—

Figure 1 represents a plan view of the apparatus applied to the motor of an automobile, showing enough of the automobile frame to illustrate the manner of its application. Fig. 2 represents an elevation of the same. Fig. 3 represents a plan view, partly in section, of the mechanism alone. Fig. 4 represents a sectional elevation of the clutch members of the mechanism, showing them in their normal position of rest. Fig. 5 represents a similar view of the same members, showing them at the end of a stroke. Fig. 6 represents an elevation of the same parts, showing the clutch members about to become disengaged in consequence of reverse driving thereof upon back-firing of the motor. Fig. 7 represents a diagrammatic view illustrating the path of the driving member of the clutch.

The same reference characters indicate the same parts in all the figures.

The clutch members of the motor starter consist of an oscillative driver 1 and a rotary driven member 2. The latter is preferably a disk, which, when the device is connected with an internal combustion motor, is secured to the shaft 3 thereof and may be the fly wheel of the motor. The disk 2 carries one, two or more elements 4 which serve as abutments or shoulders to receive the thrust of the driver, and are preferably pins projecting from the rim of the disk parallel to the axis thereof. The driver has, preferably on its end, a complemental shoulder 5 adapted to engage either of the shoulders 4 and impart movement to the disk.

The driver is in the form of a lever or pawl pivoted upon a stud 6 on a carrier 7. The latter is an arm mounted to oscillate concentrically with the disk, and has a hub 8 carried by a shoulder or flange 9 on a sleeve 10 which surrounds the shaft 3. This sleeve may be, and ordinarily is, a part of the crank case of the motor, and is held stationary. The hub 8 of the carrier is contained in a groove 11 formed in the flange 9, as shown in Fig. 3, and is retained therein by headed screws 12.

The carrier and driver are oscillated by an arm 14 on a rock-shaft 15, which latter is moved by a transverse operating shaft 16 having a foot-lever 17 and a hand-lever 18. The foot-lever projects through the floor of the automobile, as illustrated in Fig. 2, and the hand-lever is at the side, so that it may be conveniently grasped by the driver. Connection between the shafts 16 and 15 is made by arms 19 and 20 and a link 21. The connection is such that whenever the foot-lever is depressed or the hand-lever swung forward, the arm 14 is raised. This arm is connected with the driver and its carried by a link 22 which is engaged with a stud 23 on the driver. This stud is eccentric of the pivot 6 and is so located with respect to the pivot that when a pull is applied to the link, the driver is oscillated and its longer arm carrying the shoulder 5 is swung outward into the path traveled by the pins 4. Excessive movement in this direction is checked by a pin 24 on the carrier with which a shoulder 25 on the driver engages. A spring 26 interposed between the stop pin 24 and the driver also tends to throw the shoulder 5 thereof outward.

A cam lever 27 is pivotally mounted on a stud 28 carried by the driver eccentrically of the pivot 6 thereof. This stud is on the opposite side of the pivot from the shoulder 5, and the cam lever extends toward the disk or flange 9, having an eccentric curved surface 29 which rolls on the cylindrical surface of said flange. The distance from the pivot 28 to the toe 30 of the cam lever is less than the distance from the pivot to the heel 31 of the lever, so when the heel is against the flange 9, the shouldered end 5 of the driver is moved inward from the path of the pin 4. A spring 32 is interposed between an arm 33 of the driver and a cam lever 27 to hold the cam face thereof against the collar 9.

When pressure is applied by the arm 14 to the driver, it is communicated thereto by the link 22 in such a way as to tend to swing the short arm of the driver inward, and the arm having the clutch shoulder or tooth 5 outward. This movement is resisted by the lever 27, which, when the device is in normal position, has its heel in contact with the flange 9. As the movement of the carrier 7 proceeds, in consequence of the pull applied thereto, the cam lever rolls on the flange 9, until the toe thereof comes adjacent to the surface of the flange. Then the shoulder is allowed to swing outward and to engage the pin. Movement of the carrier and driver then drives the disk 2 forward, and the cam lever slides around the periphery of the disk 9.

In case an ignition in the motor should occur before the crank thereof has been carried by the dead point and while power is still being applied by the driver to the disk, the latter is driven reversely and the pin 4 pressed against the driver with great force. The driver is then moved backward and the cam lever rolls in the opposite direction on the surface of the flange 9, pushing the short arm of the driver outward and gradually withdrawing the shoulder 5 thereof from the path of the pin. This result occurs when the driver has been retracted only a few degrees and long before it reaches the limit of its travel, shown in Fig. 4. When in this limit of travel the link 22 lies against the surface of the flange 9 and is prevented from going farther, so if the driver were allowed to continue in engagement with the pin, upon occurrence of a back-fire, some parts would be broken, when the return of the driver is thus suddenly arrested. The cam lever 27, however, acts to disengage the clutch members before any possibility of breakage occurs.

The operating arm 14 is offset between its ends, and the link 22 is also offset a further amount in the same direction, so when the parts are in their normal position of rest, illustrated in Fig. 4, the driver is more than 180° in advance of its final position, illustrated in Fig. 5. Thereby the driver is enabled to rotate through more than a half revolution, and can engage one of the pins, when two are provided, whatever may be the position of the disk, provided only the pins are diametrically opposite to each other.

The pins bear such a relation to the cranks of the motor and the driver carrier is so positioned, that one stroke of the latter is enabled to engage a pin and carry the motor beyond its dead point. The line of engine cranks is illustrated by the broken line A—B in Figs. 4, 5 and 6. From these figures it will be seen that when the driver releases either pin, the cranks have been carried by the dead point and the charge which has then been compressed in any cylinder is allowed to expand and carry the engine forward. In the case of a four-cylinder motor, one of the cylinders is under compression whenever a crank passes the dead point, and another cylinder is filled, ready to be compressed, so when the motor is allowed to come naturally to rest, the expanding charge in one cylinder will be balanced by the charge being compressed in the second cylinder, and the cranks will occupy a horizontal position. With my device, the clutch shoulders are so positioned relatively to the cranks of the motor that a complete stroke of the driver will carry the motor far enough so that when released, it will tend to move ahead slightly of itself, and the compression will not be lost.

When the motor starts properly without back-firing, and pressure on the operating lever is released, the driver and rock-shafts are returned to normal position by means of a spring 34 surrounding a portion of the shaft 15 and engaging at one end the arm 14 and at the other a stationary abutment 35. As soon as the driver retracts, the pressure of the spring 32 acting on the cam lever causes the latter to roll upon the flange 9, and the driver shoulder is moved out of the path of the pins 4. This action is assisted also by the pressure applied to the link 22, which acts in the same direction as the thrust of the cam lever. In case the retraction of the driver is not rapid enough to move it clear of the path in which the pins travel, the latter will strike the end of the driver, but the yielding manner in which the latter is mounted obviates any danger of breakage thereof. The travel of the driver carrier is stopped at one limit by engagement of the link 22 with the disk 9, and at the other limit by the engagement of a stud 36 carried by the driver with the link 22. Thus the carrier and driver are prevented from passing beyond the line of pivots of the link and being carried farther by the spring 34 into an operative position.

From an inspection of the diagrammatic Fig. 7, it will be seen that the clutch shoulder of the driver travels in two paths which are concentric through the greater part of their extent, but each of which is eccentric at one end. In starting from the normal position of rest, designated at $a$, the driver shoulder travels to $b$ on an eccentric path, continuing thence in the outer circular path $c$ to the termination of its travel at $d$. In returning, the driver is retracted so that it travels on the eccentric path $d$—$e$ to the point $e$, and returns thence on the inner circular path to the starting point $a$.

I claim:

1. A motor starter comprising coöperating clutch elements, one of which is connected to the motor shaft and the other to the power-applying means, and means carried by the second of said clutch elements having an eccentric portion engaged with a stationary surface arranged to roll on such surface to disengage said clutch elements when the latter are moved oppositely to the starting force.

2. The combination with a shaft and a clutch member secured thereto, of a complemental clutch member by which power is applied to turn said shaft, a stationary member having a smooth surface concentric with said shaft, and disengaging means having an eccentric surface in rolling contact with the surface of said stationary member and connected with said complemental clutch member to remove the same from the path of the shaft clutch member when the latter is moved reversely.

3. A motor starter comprising coöperating clutch elements, one of which is connected to the motor shaft and the other to the power-applying means, a lever having an eccentric surface pivoted to one of the elements, and a surface concentric with the shaft between said lever and the shaft, on which the eccentric surface of the lever rolls and against which the lever acts to crowd the elements apart when they are moved in opposition to the starting force.

4. A motor starter comprising, in combination with a motor shaft, a fly-wheel secured to said shaft, a driving element movable both coaxially with the shaft in engagement with said fly-wheel, and transversely of the shaft, and means for imparting the latter movement to said driving element when the fly-wheel becomes the driver.

5. A motor starter comprising, in combination with a motor shaft, a driven clutch element secured to said shaft, a driving element movable both coaxially with the shaft in engagement with said driven element and transversely of the shaft into and out of engagement with said driven element, power-applying means connected to said driving element in such manner as to give the latter its transverse movement into engagement with the driven element when applying power, and means for imparting the opposite transverse movement to said driving element when the latter is driven reversely by the motor shaft.

6. A motor starter comprising, in combination with a motor shaft, a driven clutch element secured to said shaft, a driving element movable both coaxially with the shaft and transversely of the shaft into and out of the path of said driven element, and being provided with a portion adapted to engage the latter when in such path, means tending to bring the driving element into the path of the driven element, and positive means located between the driving element and the shaft constructed, arranged and organized to move that part of the driving element which engages the driven element inwardly out of such path when the motor shaft is reversely rotated.

7. In combination with an internal combustion motor and its shaft, a disk secured to said shaft, having one or more engaging elements or shoulders, a complemental clutch member having a portion to engage said shoulder, a carrier oscillatory about the axis of said disk to which said complemental clutch member is pivoted, means for swinging said latter member into engagement with said shoulder when moved in one direction, and means for swinging said member out of engagement with the shoulder upon commencement of motion in the opposite direction.

8. A mechanism for imparting rotation, comprising an oscillatively mounted driver, a rotary driven member having an axially extending shoulder or abutment at a distance from the axis of rotation adapted to be engaged by the driver, said driver having an engaging portion movable into and out of the path of said shoulder and mounted at such a distance from the axis that it may pass between the abutment and the axis, means for forcing said engaging portion outward into the path of the shoulder when moved in one direction, and means for forcing said engaging portion inward out of such path upon commencement of movement in the opposite direction.

9. A mechanism for imparting step-by-step rotation, comprising a rotary driven member having a clutch portion, a driver, means for moving said driver back and forth, said driver being so mounted that it is caused to travel in the path of said clutch portion when moved in one direction, and smooth-surfaced eccentric rolling means for shifting the driver out of such path upon commencement of it travel in the opposite direction.

10. A mechanism for imparting step-by-step rotation, comprising a rotary driven member having a shoulder, a driver having a complemental shoulder, a carrier on which said driver is pivotally mounted, means for vibrating said carrier connected to said driver at one side of its pivot, whereby to bring said shoulder into the path of said complemental shoulder in forward action, and means for displacing the shoulder of the driver from the path of the complemental shoulder of said driven member when the driver commences its retracting movement.

11. The combination with the fly wheel of an internal combustion motor, of a driver, means for vibrating said driver, coöperating shoulders on said driver and fly wheel by which the motion of the former in one direction is transmitted to the latter, and means for shifting the shoulder of the driver at the commencement of its semi-vibrations respectively into and out of the path of the shoulder on the fly wheel.

12. The combination of a rotary driven member having a shoulder, a carrier mounted to move oscillatively about the axis of said driven member, a driver pivotally mounted on said carrier and having a shoulder adapted to engage the shoulder of the driven member and impart motion thereto, means for bringing the shoulder of the driver into the path occupied by the shoulder of the driven member when said carrier is moved in one direction, and means for moving the driver shoulder out of such path upon commencement of movement of the carrier in the opposite direction.

13. The combination of a rotary driven member having a shoulder, a carrier mounted to oscillate about the axis of said driven member, a driver pivotally mounted on said carrier and having a shoulder adapted to engage the shoulder of the driven member and impart motion thereto, an operating arm connected to said driver eccentrically of the pivot thereof to move the driver both oscillatively and bodily, bringing the driver shoulder into the path of travel of the driven member shoulder when advancing the driver, and unyielding means for positively displacing the driver shoulder from such path when the driver is retracted.

14. The combination of a rotary driven member having a shoulder, a carrier mounted to oscillate about the axis of said driven member, a driver pivotally mounted on said carrier and having a shoulder adapted to engage the shoulder of the driven member and impart motion thereto, and a cam member connected with said driver for displacing the shoulder thereof from engagement with the shoulder of the driven member when the driver is retracted.

15. The combination of a driver, an oscillative carrier on which said driver is pivotally mounted, a rotary driven member mounted coaxially with said driver, complemental shoulders on said driver and driven members adapted to make positive engagement, means for causing the driver shoulder to travel in the path of travel of the driven member shoulder when moved in one direction, and wedging means for shifting the driver out of such path and causing it to travel in a different path when oppositely moved.

16. The combination of a driver, an oscillative carrier on which said driver is pivotally mounted, a rotary driven member mounted coaxially with said driver, complemental shoulders on said driver and driven members adapted to make positive engagement, and means for swinging said driver oppositely on its pivot as the carrier oscillates, to bring the driver shoulder into different paths in its driving and retracting movements, the means acting to swing the driver in one direction being a positively-acting wedge or cam.

17. A mechanism comprising a driven member having a clutch shoulder, a driver having a complemental clutch shoulder, a vibrating carrier on which said driver is movably mounted, a cam having an eccentric surface connected to said driver, and a surface over which the eccentric cam lever is caused to roll as said carrier is vibrated, whereby the driver shoulder is moved into and out of the path of the shoulder on the driven member.

18. A mechanism comprising a driven member having a clutch shoulder, a driver having a complemental clutch shoulder, a vibrating carrier on which said driver is mounted with provision for moving relatively thereto, a cam having an eccentric surface connected to said driver, and a surface over which the eccentric cam lever is caused to roll at the commencement of travel of said carrier in either direction, whereby the driver shoulder is moved alternately into and out of the path of the shoulder on the driven member whenever the carrier is reversed.

19. A mechanism comprising a rotary driven member, an oscillative driver carrier, a stationary cylindrical block, all concentrically mounted, a driver pivoted to said carrier, complemental positively engaging shoulders on said driver and driven member respectively, an operating arm, a link connected to said arm and driver, the connection with the driver being such that power applied thereto will tend to oscillate the same about its pivot and swing the shoulder thereof into the path occupied by the shoulder of the driven member, and a cam pivoted to said driver, provided with an eccentric surface arranged to roll on said cylindrical block, and arranged to exert a thrust on the driver in opposition to that applied by the operating arm.

20. A mechanism comprising a rotary driven member, an oscillative driver carrier, a stationary cylindrical block, all concentrically mounted, a driver pivoted to said carrier, complemental positively engaging shoulders on said driver and driven member respectively, an operating arm, a link connected to said arm and driver, the connection with the driver being such that power applied thereto will tend to oscillate the same about its pivot and swing the shoulder thereof into the path occupied by the shoulder of the driven member, and a cam pivoted to said driver, provided with an eccentric surface arranged to roll on said cylindrical block, and arranged to exert a thrust on the driver in opposition to that applied by the operating arm, and a spring arranged to press said cam against the surface of the block.

21. A mechanism comprising a rotary driven member, an oscillative driver carrier, a stationary cylindrical block, all concentrically mounted, a driver pivoted to said carrier, complemental positively engaging shoulders on said driver and driven member respectively, an operating arm, a link connected to said arm and driver, the connection with the driver being such that power applied thereto will tend to oscillate the same about its pivot and swing the shoulder thereof into the path occupied by the shoulder of the driven member, a stop to limit such swinging of the driver, and a cam pivoted to said driver, provided with an eccentric surface arranged to roll on said cylindrical block, and arranged to exert a thrust on the driver in opposition to that applied by the operating arm.

22. A motor starter comprising a disk secured to the shaft of a motor and having a clutch shoulder, a carrier mounted to oscillate about the axis of said disk, a driver mounted on said carrier, having a portion adapted to engage and apply pressure to said shoulder, a swinging operating arm, and a link connected to said arm and carrier, said arm and link being offset whereby to oscillate the carrier and driver through more than a semi-revolution.

23. A motor starter comprising a disk secured to the shaft of a motor and having a clutch shoulder, a carrier mounted to oscillate about the axis of said disk, a driver mounted on said carrier, having a portion adapted to engage and apply pressure to said shoulder, a swinging operating arm, and a link connected to said arm and carrier, said arm and link being offset and arranged, when the carrier is in one extreme position, to partly surround the axis of the disk and thereby be enabled to oscillate the carrier and driver through more than a half revolution.

24. In a motor starter, a driven clutch member connected with the shaft of the motor, an oscillative driver adapted to engage and impart motion to said member, a lever operable by the driver or operator of the motor, and a link between said lever and driver constructed and arranged so as partly to surround the axis of the driver, whereby a thrust continuously applied to the lever in one direction may force the driver against resistance through more than half a revolution.

In testimony whereof I have affixed my signature, in presence of two witnesses.

JOHN FRANKLIN WILKINSON.

Witnesses:
ARTHUR H. BROWN,
P. W. PEZZETTI.